US012646138B2

(12) United States Patent
Zhan et al.

(10) Patent No.: US 12,646,138 B2
(45) Date of Patent: Jun. 2, 2026

(54) METHOD, APPARATUS, ELECTRONIC DEVICE, AND STORAGE MEDIUM FOR IMAGE PROCESSING

(71) Applicant: Beijing Zitiao Network Technology Co., Ltd., Beijing (CN)

(72) Inventors: Huimin Zhan, Beijing (CN); Weiying Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 164 days.

(21) Appl. No.: 18/570,617

(22) PCT Filed: Sep. 8, 2022

(86) PCT No.: PCT/CN2022/117857
§ 371 (c)(1),
(2) Date: Dec. 14, 2023

(87) PCT Pub. No.: WO2023/040749
PCT Pub. Date: Mar. 23, 2023

(65) Prior Publication Data
US 2024/0289919 A1      Aug. 29, 2024

(30) Foreign Application Priority Data

Sep. 16, 2021    (CN) .......................... 202111088531.7

(51) Int. Cl.
*G06T 3/40*          (2024.01)
*G06V 10/70*        (2022.01)
*G06V 40/16*        (2022.01)

(52) U.S. Cl.
CPC ................ *G06T 3/40* (2013.01); *G06V 10/70* (2022.01); *G06V 40/165* (2022.01)

(58) Field of Classification Search
CPC ........ G06T 3/40; G06V 10/70; G06V 40/165; G06V 40/161

(Continued)

(56) References Cited

U.S. PATENT DOCUMENTS 9,639,930 B2 * 5/2017 Yoo ........................ G06T 7/0012
                                                                    382/128
10,573,277 B2 * 2/2020 Mano ..................... G09G 5/377
                                                                    345/667

(Continued)

FOREIGN PATENT DOCUMENTS

CN          106341720 A      1/2017
CN          107770450 A      3/2018

(Continued)

OTHER PUBLICATIONS

International Search Report issued Nov. 18, 2022 in PCT Appl. No. PCT/CN2022/117857, English translation (6 pages).

(Continued)

*Primary Examiner* — Temesghen Ghebretinsae

(57) ABSTRACT

The disclosure provides a method, apparatus, electronic device, and storage medium for image processing. The method of image processing includes: collecting a to-be-processed image comprising a target object, and processing a to-be-processed effect part of the target object as a first effect to obtain a first effect display image; and scaling up the first effect display image for display, and in accordance with a determination that a stop scaling up condition is detected, processing a to-be-adjusted effect part of the first effect display image as a second effect to obtain a second effect display image.

18 Claims, 2 Drawing Sheets

COLLECT A TO-BE-PROCESSED IMAGE COMPRISING A TARGET OBJECT, AND PROCESS A TO-BE-PROCESSED EFFECT PART OF THE TARGET OBJECT AS A FIRST EFFECT TO OBTAIN A FIRST EFFECT DISPLAY IMAGE — S110

SCALE UP THE FIRST EFFECT DISPLAY IMAGE FOR DISPLAY, AND IN ACCORDANCE WITH A DETERMINATION THAT A STOP SCALING UP CONDITION IS DETECTED, PROCESS A TO-BE-ADJUSTED EFFECT PART OF THE FIRST EFFECT DISPLAY IMAGE AS A SECOND EFFECT TO OBTAIN A SECOND EFFECT DISPLAY IMAGE — S120

(58) Field of Classification Search

USPC ........................................................ 345/667

See application file for complete search history.

(56) References Cited

U.S. PATENT DOCUMENTS

| | | | | |
|---|---|---|---|---|
| 2008/0063305 | A1* | 3/2008 | Lim ........................ | A61B 8/466 |
| | | | | 382/298 |
| 2013/0235087 | A1* | 9/2013 | Kashibuchi ............. | G06T 11/60 |
| | | | | 345/660 |
| 2017/0032493 | A1* | 2/2017 | Kashibuchi .......... | G06V 30/413 |
| | | | | 345/660 |
| 2019/0095075 | A1* | 3/2019 | Yang ........................ | G06T 5/70 |
| | | | | 715/764 |
| 2022/0321802 | A1* | 10/2022 | Li .......................... | G10H 1/366 |
| | | | | 386/280 |
| 2025/0131667 | A1* | 4/2025 | Long ........................ | G06T 3/40 |

FOREIGN PATENT DOCUMENTS

| | | | |
|---|---|---|---|
| CN | 110214262 | A | 9/2019 |
| CN | 110378847 | A | 10/2019 |
| CN | 110475150 | A | 11/2019 |
| CN | 110610459 | A | 12/2019 |
| CN | 110620935 | A | 12/2019 |
| CN | 111369427 | A | 7/2020 |
| CN | 111857923 | A | 10/2020 |
| CN | 112037121 | A | 12/2020 |
| CN | 112188103 | A | 1/2021 |
| CN | 112259062 | A | 1/2021 |
| CN | 112988027 | A | 6/2021 |
| CN | 112990084 | A | 6/2021 |
| CN | 113055611 | A | 6/2021 |
| CN | 113160031 | A | 7/2021 |
| CN | 113329234 | A | 8/2021 |
| CN | 113744135 | A | 12/2021 |
| JP | 2019009754 | A | 1/2019 |
| WO | WO-2022199102 | A1 * | 9/2022 .......... G06V 40/168 |

OTHER PUBLICATIONS

Office Action issued Sep. 7, 20222 in CN Appl. No. 202111088531.
7, English translation (18 pages).

International Search Report and Written Opinion for International
Application No. PCT/CN2022/117857, mailed Nov. 18, 2022, 15
Pages.

* cited by examiner

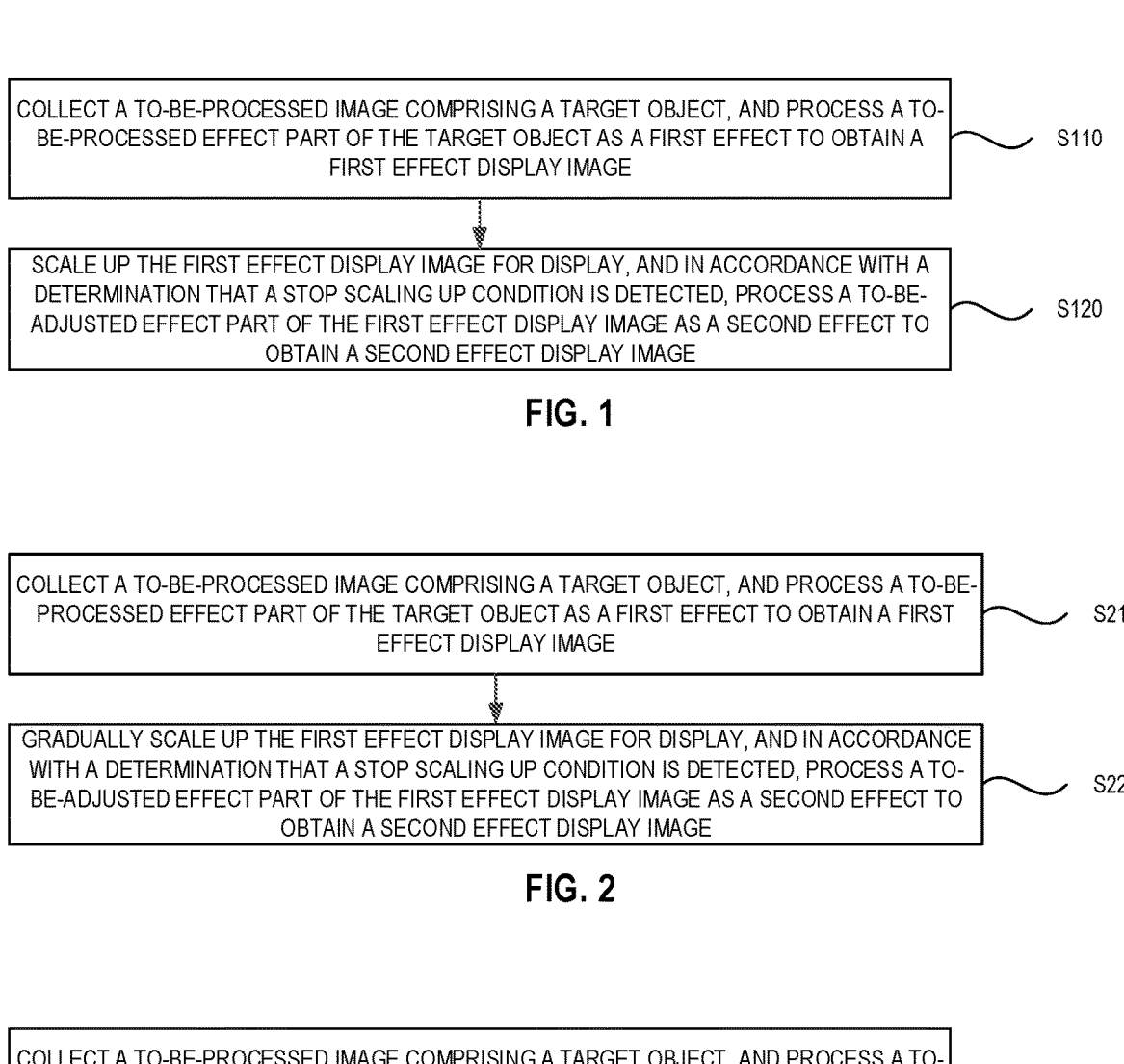

COLLECT A TO-BE-PROCESSED IMAGE COMPRISING A TARGET OBJECT, AND PROCESS A TO-BE-PROCESSED EFFECT PART OF THE TARGET OBJECT AS A FIRST EFFECT TO OBTAIN A FIRST EFFECT DISPLAY IMAGE — S110

SCALE UP THE FIRST EFFECT DISPLAY IMAGE FOR DISPLAY, AND IN ACCORDANCE WITH A DETERMINATION THAT A STOP SCALING UP CONDITION IS DETECTED, PROCESS A TO-BE-ADJUSTED EFFECT PART OF THE FIRST EFFECT DISPLAY IMAGE AS A SECOND EFFECT TO OBTAIN A SECOND EFFECT DISPLAY IMAGE — S120

FIG. 1

COLLECT A TO-BE-PROCESSED IMAGE COMPRISING A TARGET OBJECT, AND PROCESS A TO-BE-PROCESSED EFFECT PART OF THE TARGET OBJECT AS A FIRST EFFECT TO OBTAIN A FIRST EFFECT DISPLAY IMAGE — S210

GRADUALLY SCALE UP THE FIRST EFFECT DISPLAY IMAGE FOR DISPLAY, AND IN ACCORDANCE WITH A DETERMINATION THAT A STOP SCALING UP CONDITION IS DETECTED, PROCESS A TO-BE-ADJUSTED EFFECT PART OF THE FIRST EFFECT DISPLAY IMAGE AS A SECOND EFFECT TO OBTAIN A SECOND EFFECT DISPLAY IMAGE — S220

FIG. 2

COLLECT A TO-BE-PROCESSED IMAGE COMPRISING A TARGET OBJECT, AND PROCESS A TO-BE-PROCESSED EFFECT PART OF THE TARGET OBJECT AS A FIRST EFFECT TO OBTAIN A FIRST EFFECT DISPLAY IMAGE — S310

SCALE UP THE FIRST EFFECT DISPLAY IMAGE FOR DISPLAY, AND IN ACCORDANCE WITH A DETERMINATION THAT A STOP SCALING UP CONDITION IS DETECTED, PROCESS A TO-BE-ADJUSTED EFFECT PART OF THE FIRST EFFECT DISPLAY IMAGE AS A SECOND EFFECT TO OBTAIN A SECOND EFFECT DISPLAY IMAGE — S320

IN ACCORDANCE WITH A DETERMINATION THAT THE SECOND EFFECT DISPLAY IMAGE SATISFIES A SCALING DOWN CONDITION, SCALE DOWN THE SECOND EFFECT DISPLAY IMAGE — S330

FIG. 3

METHOD, APPARATUS, ELECTRONIC DEVICE, AND STORAGE MEDIUM FOR IMAGE PROCESSING

CROSS REFERENCE

Embodiments of the present disclosure claims priority to Chinese Patent Application No. 202111088531.7 filed on Sep. 16, 2021, and entitled "METHOD, APPARATUS, ELECTRONIC DEVICE, AND STORAGE MEDIUM FOR IMAGE PROCESSING".

FIELD

The present disclosure generally relates to the field of image processing, for example, to a method, apparatus, electronic device, and storage medium for image processing.

BACKGROUND

With the development of network technology, more and more applications have entered the life of users, especially a series of software that can capture short videos, which is deeply loved by users.

When capturing a corresponding video or image based on a short video software, it often performs some effect processing, but it mainly extracts corresponding effect data from an effect library and acts on the captured data. The effect image obtained at this time is not only less realistic, but also has a single effect, which leads to the problems of poor effect and poor user experience.

SUMMARY

The present disclosure provides a method, apparatus, electronic device, and storage medium for image processing to implement technical effects that can be overlaid on effects in a display of effects images to enhance the experience of users.

The present disclosure provides a method of image processing, comprising:

collecting a to-be-processed image comprising a target object, and processing a to-be-processed effect part of the target object as a first effect to obtain a first effect display image; and scaling up the first effect display image for display, and in accordance with a determination that a stop scaling up condition is detected, processing a to-be-adjusted effect part of the first effect display image as a second effect to obtain a second effect display image.

The present disclosure further provides an apparatus for image processing, comprising:

a first effect display image determination module configured to collect a to-be-processed image comprising a target object, and processing a to-be-processed effect part of the target object as a first effect to obtain a first effect display image; and a second effect display image determination module configured to scale up the first effect display image for display, and in accordance with a determination that a stop scaling up condition is detected, processing a to-be-adjusted effect part of the first effect display image as a second effect to obtain a second effect display image.

The present disclosure provides an electronic device, comprising:

at least one processor; and a storage apparatus configured to store at least one program;

wherein the at least one program, when executed by the at least one processor, causes the at least one processor to perform the above method of image processing.

The present disclosure further provides a storage medium comprising computer-executable instructions, the computer-executable instructions, when executed by a computer processor, performing the above method of image processing.

BRIEF DESCRIPTION OF THE DRAWINGS

FIG. 1 shows a schematic flowchart of a method of image processing provided by embodiment 1 of the present disclosure;

FIG. 2 shows a schematic flowchart of a method of image processing provided by embodiment 2 of the present disclosure;

FIG. 3 shows a schematic flowchart of a method of image processing provided by embodiment 3 of the present disclosure;

DETAILED DESCRIPTION

Figure 4:
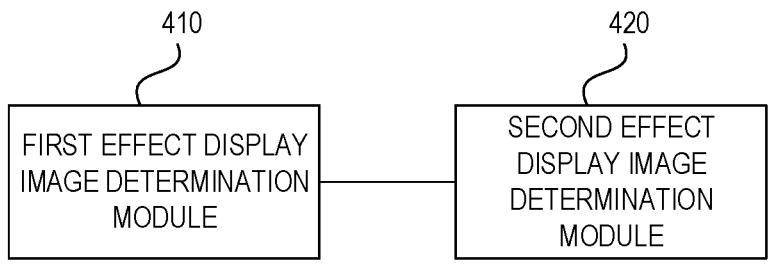
FIG. 4 shows a structural schematic diagram of an apparatus for image processing provided by embodiment 4 of the present disclosure.

Embodiments of the present disclosure will be described below with reference to the accompanying drawings. Although some embodiments of the present disclosure are shown in the accompanying drawings, it should be understood that the present disclosure can be implemented in various forms, and these embodiments are provided for a more thorough and complete understanding of the present disclosure. It should be understood that the drawings and embodiments of the present disclosure are intended to be exemplary only.

It should be understood that the various steps documented in the method embodiments of the present disclosure may be performed in a different order, and/or in parallel. In addition, the method embodiments may comprise additional steps and/or omit performing the illustrated steps. The scope of the present disclosure is not limited in this regard.

As used herein, the term "comprises" and its variations are open-ended, i.e., "comprising, but not limited to". The term "based on" is "based at least partially on". The term "one embodiment" represents "at least one embodiment"; the term "another embodiment" represents "at least one additional embodiment"; the term "some embodiments" represents "at least some embodiments". Related definitions of other terms will be given in the description below.

It should be noted that references to the concepts of "first", "second" and the like in the present disclosure are only used to distinguish different apparatuses, modules, or units, and are not intended to limit the order or interdependence of the functions performed by these apparatuses, modules, or units. It should be noted that references to the qualifications "one" and "a plurality of" in the present disclosure are schematic rather than limiting. It should be understood by those skilled in the art that the term "one or more" should be understood unless the context clearly indicates otherwise.

The names of messages or information interacting between a plurality of apparatuses in embodiments of the present disclosure are used for illustrative purposes only and are not intended to place limitations on the scope of those messages or information.

Before introducing the present technical solution, the application scenes can be illustrated with examples. The technical solution of the present disclosure can be applied to any picture that requires effect display, for example, in a video call, the effect display can be performed; or in a live broadcast scene, the effect display can be performed on an anchor user; or the effect display can further be applied in a video capturing process, such as in a short video capturing scene, where the effect display can be performed on an image corresponding to the user to be captured.

Embodiment 1

FIG. 1 shows a schematic flowchart of a method of image processing provided by embodiment 1 of the present disclosure. Embodiments of the present disclosure are applicable when, in a variety of image display scenes supported by the Internet, for processing a facial image of a target object to an effect image and displaying the effect image. The method may be performed by an apparatus for image processing, which may be implemented in the form of software and/or hardware, for example, by an electronic device, which can be a mobile terminal, a personal computer (PC) or a server. Any scene of image display is usually implemented by a client and a server, etc. The method provided by the present embodiment may be performed by a server, a client, or a combination of a client and a server.

As shown in FIG. 1, the method comprises:

S110. Collect a to-be-processed image comprising a target object, and process a to-be-processed effect part of the target object as a first effect to obtain a first effect display image.

A variety of possible application scenes have been briefly described above and will not be further described herein. Herein, an apparatus for performing the method of image processing provided by embodiments of the present disclosure may be integrated in an application software supporting the image processing function, and the software may be installed in an electronic device, e.g., the electronic device may be a mobile terminal or a PC, etc. The application software may be a type of software for image/video processing, and the application software will not be repeated herein as long as it can implement the image/video processing.

The to-be-processed image can be based on an image captured by the application software, or a pre-stored image obtained by the application software from a storage space. In the application scene, the to-be-processed image can be collected in real time or periodically. For example, in a live broadcast scene or a video capturing scene, the camera apparatus collects in real time an image corresponding to a target comprised in the target scene, at which time, the image collected by the camera apparatus may be taken as the to-be-processed image. Accordingly, the target object comprised in the target scene may be a user, a pet, a flower, a plant, a tree, and so on. The to-be-processed effects part is a part of the target object that requires effect display, for example, the target object is a user or a pet, and the to-be-processed effect part can be any part that can be captured. The first effect can be any effect. After the to-be-processed effect part is adjusted to the first effect, a corresponding image is determined as the first effect display image. The first effect display image can be displayed on a terminal device corresponding to the target object.

The number of target objects in the same capturing scene may be one or more, and whether it is one or more, the technical solution provided in the present disclosure may be adopted to determine the effect display image.

In the present embodiment, the to-be-processed effect part may be any part of the face display of the target object. Accordingly, any effect can be any adjustable effect of any conceivable facial part.

In any video capturing or live broadcasting scene, images comprising the target object can be captured in real time or at intervals to be determined as to-be-processed images. Simultaneously, a to-be-processed effect part of the target object in the to-be-processed image can be determined, and the to-be-processed effect part can be adjusted to the first effect, thereby obtaining the first effect display image.

In the application process, whether or not to capture an image to be-processed that comprises the target object can be determined in accordance with an operation of the user. In accordance with a detection that an image processing control is triggered, collect the to-be-processed image comprising the target object; in accordance with a determination, based on collected voice information, that an image processing wake-up word is triggered, collect the to-be-processed image comprising the target object; or, determine a to-be-detected feature of facial information in a collected to-be-used image, and in accordance with a determination that the detected feature matches a predetermined feature, determine the to-be-used image as the to-be-processed image.

The image processing control can be a button that can be displayed on the display interface of the application software, the trigger of which characterizes the requirement of capturing the to-be-processed image and performing effect processing on the to-be-processed image. When the user triggers the button, it can be assumed that the image function of the effect display is to be triggered, and at this time, the to-be-processed image comprising the target object can be captured. For example, if applied in a static image capture scene, if the user triggers the effect processing control, it can automatically trigger the capturing of the to-be-processed image comprising the target object. In the scene of video livestreaming, for example, in the process of selling goods or capturing videos, voice information of an anchor user or the captured object can be captured, and the captured voice information can be analyzed and processed to recognize the text corresponding to the voice information. If the text corresponding to the voice information comprises a predetermined wake-up word, for example, the wake-up word may be: "Please turn on the effect function" and other types of words, it means that the anchor or the captured object is required to display the effect, and at this time, the to-be-processed image comprising the target object can be captured. In application scenes, for example, in the scene of capturing a mime video, the facial feature in the to-be-used image captured can be analyzed and processed in real time to obtain the feature detection results of each part of the facial image, which is determined as the to-be-detected feature. If respective to-be-processed feature matches a predetermined feature, the to-be-processed image can be determined as the to-be-processed image. In the present embodiment, at least one feature that triggers the display of an effect part for respective part can be predetermined, and the predetermined feature can be determined as the predetermined feature. In a non-mime scene, the facial features of the target object may also be analyzed and processed to determine whether to capture the to-be-processed image and perform effect processing on it.

Whether in the video livestreaming scene or image processing scene, if there is a requirement for real-time collection of the target object in the target scene, the image can be collected in real time, and the image collected at this time can be determined as the to-be-processed image; accordingly, the to-be-processed image can be analyzed and processed, and if a particular requirement is satisfied, the collected to-be-processed image can be determined as the to-be-processed image if the particular requirement is satisfied, i.e., the to-be-processed image can be collected.

In the present embodiment, processing a to-be-processed effect part of the target object as a first effect to obtain a first effect display image comprises: determining a facial image of the target object in the to-be-processed image; and determining the to-be-processed effect part from the facial image, and processing the effect site to be processed as the first effect to obtain the first effect display image.

The to-be-processed image is captured based on the camera apparatus on the terminal device belonging to the application software. If the target object is a user, the image to be-processed captured by the camera apparatus may be a full-body image, a half-body image, or a facial image of the target object. The captured image is related to the relative position of the camera apparatus and the target object. The to-be-processed effect part is the part where the effect is first performed on the image to be processed. The first effect display image is an effect display image obtained after the first processing of the to-be-processed effect part.

If the target object in the-be-processed image is a full-body image, image detection technology can be adopted to recognize the facial image in the full-body image and recognize the to-be-processed effect part of the facial image. After recognizing the to-be-processed effect part, a first effect can be filtered out from a predetermined plurality of to-be-processed effects, and a first effect display image is obtained. If the target object in the to-be-processed image only comprises a facial image, the image detection technique can be directly adopted to determine the to-be-processed effect part in the to-be-processed image.

As an example, the to-be-processed effect part is a mouth, and a plurality of to-be-processed effects comprise a duck face (like the mouth of a goldfish), a wry-mouthed snicker, a widely opening mouth, and the like. In the collection of to-be-processed image, the facial area of the to-be-processed image can be determined, and the mouth in the facial area is determined. At this time, any one of the effects to be selected can be determined as the first effect. It is also possible to determine the first effect from a plurality of to-be-selected effects based on the voice information of the user in the video livestreaming scene, e.g., when voice of ha-ha-ha is detected, the mouth is opened widely as the first effect. If the mouth feature obtained from the analysis is a "duck mouth" state, a duck face effect can be added and determined as the first effect. That is, based on the voice information and facial feature, the target object can be added to the corresponding effects for the target object.

In the present embodiment, the first effect, to which the to-be-processed effect part is processed, is selected from a plurality of to-be-processed effects. The selection method is related to a portion of content belonging to a livestreaming scene, a short video scene, or a captured static or dynamic video image. The portion of content comprises voice information and/or facial features of the target object.

Obtaining the first effect display image may be determined by adopting the above manner, or it may be implemented by adopting a deep learning network. In the present embodiment, processing a to-be-processed effect part of the target object as a first effect to obtain a first effect display image comprises: processing the to-be-processed image based on a pre-trained image processing model, to obtain the first effect display image with the to-be-processed effect part of the target object being processed as the first effect.

The image processing model is a pre-trained machine learning model. The machine learning model can be integrated in the application software. The image processing model can be obtained by adopting an adversarial training manner. The input data of the image processing model obtained by training can be a plurality of un-be-processed effect images, and the theoretical image can be the image of the-be-processed effect part adjusted to the first effect, and the model parameters in the model can be adjusted based on the actual output image of the model and the theoretical image to obtain the image processing model.

The collected to-be-processed images may be input into a trained image processing model, and the image processing model may output a first effect display image in which the to-be-processed effect part is processed as the first effect.

S120. Scale up the first effect display image for display, and in accordance with a determination that a stop scaling up condition is detected, process a to-be-adjusted effect part of the first effect display image as a second effect to obtain a second effect display image.

The stop scaling up condition can be a condition where the first effect display image is no longer being scaled up in the process of scaling it up. The to-be-adjusted effect part can be another effect part in the target object. The second effect is the effect to which the to-be-adjusted part is adjusted. The image in which the to-be-adjusted part is adjusted to the second effect is determined as the second effect display image. In this case, the second effect display image comprises the contents of the first effect display image. In other words, the second effect display image is an effect display image obtained by overlaying an effect on the first effect display image on the basis of the first effect.

The to-be-processed effect part and the to-be-adjusted effect part can be the same or different. Usually, to-be-processed effect part and the to-be-adjusted effect part can be different in order to overlay different parts of the effect to improve the user experience. The first and second effects are relative, the first effect is determined as the effect to which the-be-processed effect part is adjusted, and the second effect is determined as the effect to which the-be-processed effect part is adjusted. The first effect is different from the second effect.

The final image obtained after overlaying the effects can be determined as a stop-motion image, i.e., the second effect display image displayed on the display interface.

After obtaining the first effect display image, the first effect display image can be scaled up for display. In the process of scaling up for display, if a stopping condition for scaling up is detected currently, to-be-adjusted effect part in the first effect display image can be adjusted to the second effect, so as to obtain the second effect display image.

The technical solution of embodiments of the present disclosure, can collect a to-be-processed image comprising a target object, and process a to-be-processed effect part of the target object as a first effect to obtain a first effect display image. In order to improve the visual impact of the user, the first effect display image for display can be scaled up, and in accordance with a determination that a stop scaling up condition is detected, a to-be-adjusted effect part of the first effect display image can be processed as a second effect to obtain a second effect display image. This solves the problem of poor authenticity of effects images and single effects in related technologies, which leads to poor user experience. This also implements the process of displaying effects images, can also be overlaid on the effects, thus improving the display of effects of coolness, fun, and thus improve the user experience of the technical effect.

Embodiment 2

FIG. 2 shows a schematic flowchart of a method of image processing provided by embodiment 2 of the present disclosure. Based on the foregoing embodiment, it is possible to describe "processing a to-be-processed effect part of the target object as a first effect to obtain a first effect display image" and "scaling up the first effect display image for display". The implementation method can refer to the description of the present technical solution. Herein, the same or corresponding technical terms as the above embodiment are not repeated here.

As shown in FIG. 2, the method comprises:

S210. Collect a to-be-processed image comprising a target object, and process a to-be-processed effect part of the target object as a first effect to obtain a first effect display image.

In practical application, the number of the target objects in the target scene can be one or more, and in order to achieve the pertinence of the effect display, it is possible to predetermine the main target object, or predetermine which area of the to-be-processed image is located in which the user is determined as the main target object.

As an example, in the livestreaming scene, if two anchors are comprised, the main anchor user can be predetermined, and the main anchor user is determined as the target object. Alternatively, the user in the left half of the to-be-processed image may be predetermined as the target object. In other words, if a plurality of users is comprised in the to-be-processed images, it is possible to determine the target object from the plurality of users based on the predetermined rules.

The to-be-processed image may comprise only the target object or may comprise objects other than the target object. If the captured to-be-processed image comprises a plurality of users, the plurality of users can be determined as the target object and all of them can be performed with effects processing; if there is only one user in the to-be-processed image, the user can be determined as the target object. If the to-be-processed image comprises a plurality of users, only one user is processed, and the corresponding image processing rules can be predetermined so that the target object can be determined from the plurality of users when the captured to-be-processed image comprises a plurality of users.

If the to-be-processed image comprises a plurality of objects, the target objects are determined based on the predetermined rules, and the target objects are performed with effect processing to obtain the first effect display image.

The predetermined rule may be a predetermined main capture object, for example, a corresponding control on the display interface for selecting the main capture object. The predetermined rule may also be to set the main capture area, for example, the left half of the entry screen is determined as the main capture area, and accordingly, the user corresponding to the main capture area is the target object.

If the user predetermined the main target object, the main target object in the to-be-processed image can be determined based on the predetermined rules, and effect processing is performed it to obtain the first effect display image.

If the main target object is not set, a plurality of users in the screen can be determined as the target object, and effect processing is performed on the to-be-processed effect part of respective target object to obtain the first effect display image.

S220. Gradually scale up the first effect display image for display, and in accordance with a determination that a stop scaling up condition is detected, process a to-be-adjusted effect part of the first effect display image as a second effect to obtain a second effect display image.

Gradually scaling up can be that if the starting image scale is 30% and the ending image scale is 100%, the image being scaled up by one percent at a time, which can be considered as gradually scaling up. For optimal scaling up, the gradually scaling up can be from 30% to 50% at a time.

The first effect display image can be gradually scaled up in accordance with the predetermined rules for scaling up the first effect display image.

In the present embodiment, in accordance with a determination that the number of target objects in the first effect display image is larger than one, scale up an effect display image corresponding to the plurality of target objects in a split screen for display.

If the number of target objects in the first effect display image is a plurality, and the to-be-processed effect part of respective target object is set to the first effect, the display screen can be divided into a plurality of display areas, the number of which is the same as the number of target objects. Respective target object can be placed in the corresponding display area and then scaled up for display. Alternatively, the facial image of respective target object can be placed in the corresponding display area and then scaled up for display.

In the present embodiment, gradually scaling up comprises: gradually scaling up the first effect display image by a predetermined scale for display; gradually scaling up a facial image of the target object in the first effect display image by a predetermined scale for display; or, gradually scaling up a facial image of the target object in the first effect display image by a predetermined scale, and in accordance with a detection that a scaling up scale of the facial image reaches a predetermined scaling up scale threshold, gradually scaling up the to-be-processed effect part that is processed as the first effect for display.

The predetermined scale may be a scale at which the first effect display image is scaled up at a time on a basis of the to-be-processed image, e.g., a predetermined scale may be 30%. A predetermined scaling up threshold may be 50%.

The scaling up method for the first effect display image comprises at least three implementation methods. A first implementation method can be that the first effects display image is determined as a whole and gradually scaled up by a scaling up scale set each time for display. A second implementation method can be that the to-be-processed effect part of the target is mainly processed with effect processing in the first effect display image, and the to-be-processed effect part is mainly located in the face, and at this time, the facial image in the first effect display image can be scaled up by a predetermined scale. A third implementation method can be that, gradually scaling up a facial image of the target object by a predetermined scale for display, and in accordance with a detection that a scaling up scale of the facial image reaches a predetermined scaling up scale threshold, gradually scaling up the to-be-processed effect part corresponds to the first effect for display.

In the present embodiment, the advantage of scaling up the first effect display image is that the changes in the effect image can be appreciated gradually, thereby improving the technical effect of the experience of the user.

In practical application, the first effect display image is not unlimitedly scaled up, and when a stop scaling up condition is reached, it is necessary to stop scaling up the image. In the present embodiment, the stop scaling up condition comprises: a display size of the first effect display image reaching a predetermined display size threshold; or, a duration of scaling up the first effect display image for display reaching a predetermined scaled up display duration threshold.

The predetermined display size threshold is a maximum scaling up size of the predetermined effects display image. The predetermined scaled up display duration threshold is a time from the beginning of scaling up to the end of scaling up of the first effects display image.

During the scaling up of the first effect display image for display, a display size of the first effect display image scaled up for display may be recorded based on the computer device, and when it reaches a predetermined display size threshold, it is necessary to stop scaling up the first effect display image continually. Alternatively, when the first effects display image starts to be scaled up, the scaling-up start time is recorded, and when the interval time between the current time and the scaling-up start time is detected to reach the predetermined scaling-up display time threshold, it is necessary to stop scaling up the first effects display image continually.

In accordance with a determination that a stop scaling up condition is detected for the first effect display image, in order to increase the visual impact for the user, process a to-be-adjusted effect part of the first effect display image as a second effect to obtain a second effect display image. For example, determine the to-be-adjusted effect part of the first effect display image, and process the to-be-adjusted effect part to be the second effect, to obtain the second effect display image.

The to-be-processed effect part in the first effect display image may be processed into a processing manner of the second effect. The manner may be performed in the same manner as converting the to-be-processed image into the first effect display image.

The first effect display image may be input into a neural network model to obtain a second effect display image in which the to-be-adjusted part is processed as a second effect. Alternatively, the image detection technique is adopted to determine the to-be-adjusted effect part in the first effect display image, and the to-be-adjusted effect part is adjusted to the second effect to obtain the second effect display image.

In the present embodiment, the to-be-processed effect part may be any facial part different from the to-be-processed effect part, e.g., the to-be-processed effect part may be a mouth and the to-be-adjusted effect part may be an eye. The second effect can be scaling up the eyes, converting the scaling up of the eyes into at least one of a cock-eye effect, a squinting eye effect, or an upper eyelid effect. In other words, the second effect is overlaid on the basis of the first effect to obtain the second effect display image.

The-be-processed effect part and the-be-processed effect part can be the same effect part, but the first effect and the second effect are different effects.

The processing a to-be-adjusted effect part of the first effect display image as a second effect comprises: determining a to-be-overlaid effect from at least one to-be-selected effect based on scene information of a scene to which the to-be-processed image belongs; wherein the to-be-overlaid effect is the second effect; and overlaying the to-be-overlaid effect to the to-be-adjusted effect part.

The scene information can be the speech or expression information of the user in the livestreaming scene or video scene. The overlay effect can be a new effect that can be added on the basis of the first effect, i.e., the second effect.

In accordance with a determination that a stop scaling up condition is detected for the first effect display image, the content of the video scene or the livestreaming scene can be determined. Based on such content of the scene, the to-be-adjusted effect part in the first effect display image can be determined, and the to-be-adjusted effect part can be adjusted to a second effect to obtain the second effect display image.

On the basis of the above technical solution, after the second effect display image is obtained, the second effect display image can be displayed, and at the same time, it is also possible to add an additional effect for the second effect display image, and update the second effect display image based on the additional effect.

An additional effect can be dynamic and/or static. Dynamic effects can be spooky effects, i.e., adding spooky effects to the target object. The static effect may be an effect that increases the atmosphere, for example, a bubble effect.

In the technical solution of embodiments of the present disclosure, after determining the first effect display image, the first effect display image can be gradually scaled up to dynamically display the first effect. In accordance with a determination that the first effect display image is detected to be scaled up to a stop scaling up condition, the to-be-adjusted effect part can be adjusted to the second effect to obtain the second effect display image. Simultaneously, additional effects can be added to the target object on the basis of the second effect display image, which implements a dynamic overlaying of the effects, and thus improves the image display effect as well as the user experience of the technical effect.

Embodiment Three

FIG. 3 shows a schematic flowchart of a method of image processing provided by embodiment 3 of the present disclosure. On the basis of the foregoing embodiments, after the second effect display image is displayed, performing a scaling down on the second effect display image and restoring the second effect display image to the-be-processed image, the manner of implementation of which can be described in the present technical program. The technical terms which are the same as or corresponding to the above embodiments are not repeated herein.

As shown in FIG. 3, the method comprises:

S310. Collect a to-be-processed image comprising a target object, and process a to-be-processed effect part of the target object as a first effect to obtain a first effect display image.

S320. Scale up the first effect display image for display, and in accordance with a determination that a stop scaling up condition is detected, process a to-be-adjusted effect part of the first effect display image as a second effect to obtain a second effect display image.

S330. In accordance with a determination that the second effect display image satisfies a scaling down condition, scale down the second effect display image.

The scaling down condition can be an actual display duration of the second effect display image reaching a predetermined display duration threshold, or it can further be that a trigger for a scaling down display control by the user is detected.

In accordance with a detection that a scaling down control is triggered, the second effect display image can be scaled down for display. In order to improve the automaticity of the image display, it is also possible that, in accordance with a detection that an actual display duration of the second effect display image reaching a predetermined display duration threshold, it indicates that a scaling down condition is satisfied, and at this time, the second effect display image can be scaled down.

On the basis of the above technical solution, in accordance with a determination that the second effect display image satisfies a scaling down condition, scaling down the second effect display image comprises: in accordance with a determination that the second effect display image is detected to satisfy a scaling down condition, gradually scaling down a size of the second effect display image to an original size; wherein an image size consistent with a size of the to-be-processed image is determined as the original size.

Scaling down the second effect display image can be a one-time change back to the original size corresponding to the to-be-processed image. To improve the user experience, the size of the second effect display image can be gradually scaled down to the original size. The gradual scaling down can be 20% or 30% at a time to allow for a smooth transition during the scaling down of the effect display image.

On the basis of the above technical solution, gradually scaling down a size of the second effect display image to an original size comprises: during the scaling down of the second effect display image, maintaining the effect of the second effect display image unchanged, and in accordance with a detection that the size of the second effect display image is restored to the original size, replacing the second effect display image restored to the original size with the to-be-processed image; or, during the scaling down of the second effect display image, removing a plurality of effects from the second effect display image, to cause the scaled-down image to be the to-be-processed image when the size of the second effect display image is scaled down to the original size.

During the scaling down of the second effect display image, a plurality of effects in the second effect display image can be maintained unchanged if the first effect, the second effect, or an additional effect is comprised in the second effect display image. In other words, the second effect display image is gradually scaled down while the effects in the second effect display image maintains unchanged. Alternatively, during the scaling down of the second effect display image, the plurality of effects can be removed sequentially in a flashback manner. The advantage of this setting is that it implements a visual buffering effect by gradually changing the effect images.

On the basis of the above technical solution, after the second effect display image is scaled down, if the second effect display image comprises a first effect and a second effect, the first effect and the second effect are removed to ensure the continuation of the video and livestreaming.

Dynamic or static effects can be added to the target object in the to-be-processed image when the second effect display image is scaled down and restored to the to-be-processed image, the contents of which will not be described herein.

The technical solution of embodiments of the present disclosure, after the second effect display image is displayed, the second effect display image can be scaled down, and corresponding processing can be performed during the scaling down, to enable a smooth transition of the effect image during the scaling down, so as to achieve the technical effect of improving the user experience.

Embodiment IV

FIG. 4 shows a structural schematic diagram of an apparatus for image processing provided by embodiment 4 of the present disclosure. As shown in FIG. 4, the apparatus comprises: a first effect display image determination module 410 and a second effect display image determination module 420.

The first effect display image determination module 410 is configured to collect a to-be-processed image comprising a target object, and processing a to-be-processed effect part of the target object as a first effect to obtain a first effect display image; and the second effect display image determination module 420 is configured to scale up the first effect display image for display, and in accordance with a determination that a stop scaling up condition is detected, processing a to-be-adjusted effect part of the first effect display image as a second effect to obtain a second effect display image.

Based on the above technical solution, the first effect display image determination module 410 is configured to: in accordance with a detection that an image processing control is triggered, collecting the to-be-processed image comprising the target object; and/or in accordance with a determination, based on collected voice information, that an image processing wake-up word is triggered, collect the to-be-processed image comprising the target object; and/or, determine a to-be-detected feature of facial information in a collected to-be-used image, and in accordance with a determination that the detected feature matches a predetermined feature, determining the to-be-used image as the to-be-processed image.

Based on the above technical solution, the first effect display image determination module 410 is configured to: determine a facial image of the target object in the to-be-processed image; and determine the to-be-processed effect part from the facial image, and process the effect site to be processed as the first effect to obtain the first effect display image.

Based on the above technical solution, the first effect display image determination module 410 is configured to: process the to-be-processed image based on a pre-trained image processing model, to obtain the first effect display image with the to-be-processed effect part of the target object being processed as the first effect.

Based on the above technical solution, the second effect display image determination module 420 comprises: a first effect display image scaling up unit configured to gradually scale up the first effect display image for display.

Based on the above technical solution, the second effect display image determination module 420 is configured to: in accordance with a determination that the number of target objects in the first effect display image is larger than one, scale up an effect display image corresponding to the plurality of target objects in a split screen for display.

Based on the above technical solution, the first effect display image scaling up unit is configured to: gradually scale up the first effect display image by a predetermined scale for display; gradually scale up a facial image of the target object in the first effect display image by a predetermined scale for display; or, gradually scale up a facial image of the target object in the first effect display image by a predetermined scale, and in accordance with a detection that a scaling up scale of the facial image reaches a predetermined scaling up scale threshold, gradually scale up the to-be-processed effect part that is processed as the first effect for display.

Based on the above technical solution, the stop scaling up condition comprises at least one of:

a display size of the first effect display image reaching a predetermined display size threshold; or, a duration of scaling up the first effect display image for display reaching a predetermined scaled up display duration threshold.

Based on the above technical solution, the second effect display image determination module 420 is configured to determine the to-be-adjusted effect part of the first effect display image, and process the to-be-adjusted effect part to be the second effect based on scene information of a scene to which the to-be-processed image belongs, to obtain the second effect display image; wherein the first effect is different from the second effect.

Based on the above technical solution, the apparatus further comprises: a second effect display image scaling down module, which is configured to, in accordance with a determination that the second effect display image satisfies a scaling down condition, scale down the second effect display image.

Based on the above technical solution, the second effect display image scaling down module is configured to, in accordance with a determination that the second effect display image is detected to satisfy a scaling down condition, gradually scale down a size of the second effect display image to an original size; wherein an image size consistent with a size of the to-be-processed image is determined as the original size, and the scaling down condition comprises at least one of a display duration of the second effect display image reaching a predetermined display duration threshold, and detecting a trigger for a scaling down control.

Based on the above technical solution, the second effect display image scaling down module is configured to, during the scaling down of the second effect display image, maintain the effect of the second effect display image unchanged, and in accordance with a detection that the size of the second effect display image is restored to the original size, replace the second effect display image restored to the original size with the to-be-processed image; or, during the scaling down of the second effect display image, remove a plurality of effects from the second effect display image, to cause the scaled-down image to be the to-be-processed image when the size of the second effect display image is scaled down to the original size.

Based on the above technical solution, the apparatus further comprises: an additional effect overlay module, which is configured to, in accordance with a determination that the second effect display image is obtained or the size of the second effect display image is scaled down to the original size, add an additional effect for the second effect display image, and update the second effect display image based on the additional effect; wherein the additional effect is at least one of a dynamic effect and a static effect.

The technical solution of embodiments of the present disclosure can collect a to-be-processed image comprising a target object, and processing a to-be-processed effect part of the target object as a first effect to obtain a first effect display image. In order to improve the visual impact of the user, scale up the first effect display image for display, and in accordance with a determination that a stop scaling up condition is detected, processing a to-be-adjusted effect part of the first effect display image as a second effect to obtain a second effect display image, which solves the problem of poor authenticity of effects images and single effects in related technologies, leading to poor user experience, and implements the process of effects images can be overlaid on the effects, thus improving the coolness and fun of the effects displayed, and thus improving the user experience of the technical effect.

The apparatus for image processing provided in embodiments of the present disclosure can perform the method of image processing provided in any embodiment of the present disclosure, and has functional modules and effects corresponding to the performance of the method.

The above apparatus comprises a plurality of units and modules that are divided in accordance with functional logic, but are not limited to the above division, as long as they can implement the corresponding functions; in addition, the names of the plurality of functional units are only for the purpose of facilitating differentiation between each other, and are not intended to limit the scope of protection of the embodiments of the present disclosure.

Embodiment V

Figure 5:
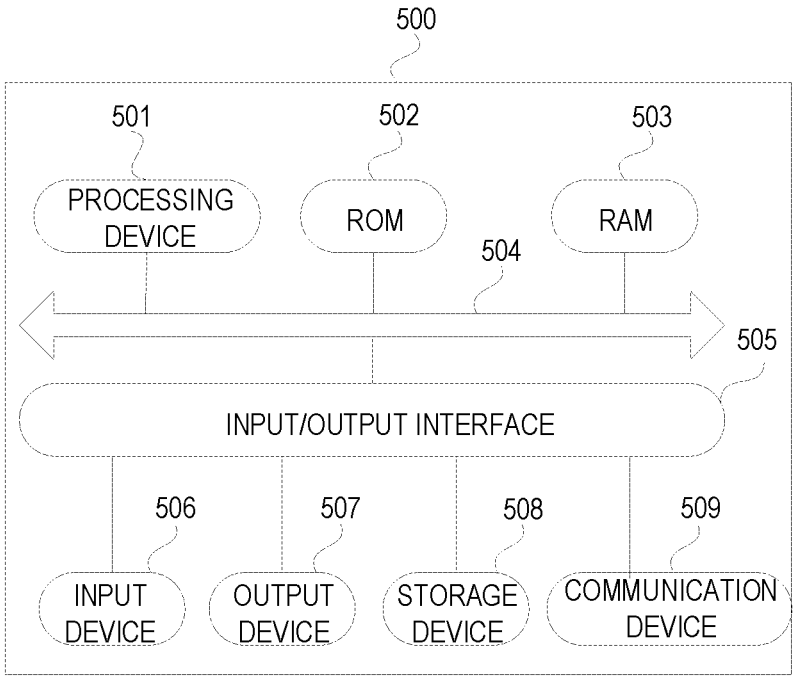
FIG. 5 shows a structural schematic diagram of an electronic device provided by embodiment 5 of the present disclosure.

FIG. 5 shows a structural schematic diagram of an electronic device provided by embodiment 5 of the present disclosure. Referring to FIG. 5, a schematic diagram of a structure of an electronic device (e.g., a terminal device or a server in FIG. 5) 500 suitable for use in implementing embodiments of the present disclosure is shown. The terminal device in embodiments of the present disclosure may comprise an electronic device such as a cell phone, a laptop computer, a digital broadcast receiver, a Personal Digital Assistant (PDA), a Portable Android Device (PAD), a Portable Media Player (PMP), an in-vehicle terminal (e.g., an in-vehicle navigation terminal), and the like, and fixed terminals such as a digital television (TV), a desktop computer, and the like.

As shown in FIG. 5, the electronic device 500 may comprise a processing device (e.g., a central processor, a graphics processor, etc.) 501, which may perform a variety of appropriate actions and processes based on a program stored in Read-Only Memory (ROM) 502 or loaded from the storage device 508 into Random Access Memory (RAM) 503 to perform various appropriate actions and processes. Various programs and data required for operation of the electronic device 500 are also stored in the RAM 503. The processing device 501, the ROM 502, and the RAM 503 are connected to each other via the bus 504. An input/output (I/O) interface 505 is also connected to bus 504.

Generally, the following devices may be connected to the I/O interface 505: an input device 506 comprising, for example, a touch screen, a touch pad, a keyboard, a mouse, a video camera, a microphone, an accelerometer, a gyroscope, and the like; an output device 507 comprising, for example, a liquid crystal display (LCD), a speaker, a vibrator, and the like; a storage device 508 comprising, for example, a magnetic tape, a hard disk, and the like; and a communication device 509. The communication device 509 may allow the electronic device 500 to communicate wirelessly or wiredly with other devices to exchange data. Although FIG. 5 illustrates electronic device 500 with various devices, it should be understood that it is not required to implement or have all of the illustrated devices. More or fewer devices may alternatively be implemented or possessed.

In particular, according to embodiments of the present disclosure, the process described with reference to the flowchart above may be implemented as a computer software program. For example, embodiments of the present disclosure comprise a computer program product comprising a computer program hosted on a non-transitory computer-readable medium, the computer program comprising program code for executing the method shown in the flow-chart. In such embodiments, the computer program may be downloaded and installed from a network via the commu-nication device 509, or from the storage device 508, or from the ROM 502. When the computer program is executed by the processing device 501, the above functions defined in the method of the embodiments of the present disclosure are performed.

The names of the messages or information interacted between the plurality of devices in the presently disclosed embodiments are for illustrative purposes only and are not intended to limit the scope of such messages or information.

The electronic device provided in the embodiments of the present disclosure belongs to the same concept as the video image processing method provided in the above embodi-ments, and technical details not described in detail in the present embodiments can be found in the above embodi-ments, and the present embodiments have the same benefi-cial effects as the above embodiments.

Embodiment VI

Embodiments of the present disclosure provides a storage medium comprising computer-executable instructions, the computer-executable instructions, when executed by a com-puter processor, performing the method of video image processing provided by the above embodiment.

It is noted that the computer-readable medium described above in the present disclosure may be a computer-readable signal medium or a computer-readable storage medium or any combination thereof. The computer-readable storage medium may, for example, be a system, device, or apparatus or device of electricity, magnetism, light, electromagnetism, infrared, or semiconductors, or an electrical connection of any one or more wires, or a combination of the above. The computer-readable storage medium may comprise: portable computer disk, hard disk, random access memory (RAM), read-only memory (ROM), erasable programmable read-only memory (Erasable Programmable Read-Only Memory, EPROM, or flash memory), optical fiber, portable compact disk read-only memory (Compact Disc Read-Only Memory, CD-ROM, optical storage device, magnetic storage device, or any suitable combination of the foregoing. For purposes of the present disclosure, a computer-readable storage medium may be any tangible medium that contains or stores a program that may be used by or in combination with an instruction execution system, apparatus, or component. And in the present disclosure, a computer-readable signal medium may comprise a data signal propagated in a base-band or as part of a carrier carrying computer-readable program code. Such propagated data signals may take a variety of forms, comprising electromagnetic signals, opti-cal signals, or any suitable combination of the foregoing. The computer-readable signal medium may also be any computer-readable medium other than a computer-readable storage medium that sends, disseminates, or transmits a program for use by, or in conjunction with, an instruction-executing system, apparatus, or component. The program code contained on the computer-readable medium may be transmitted using any suitable medium, comprising: wire, fiber optic cable, radio frequency (RF), etc., or any suitable combination thereof.

In some implementations, clients, servers may commu-nicate with any currently known or future developed net-work protocol such as HyperText Transfer Protocol (HTTP) and may be interconnected with any form or medium of digital data communication (e.g., a communications net-work). Examples of communication networks comprise Local Area Networks (LAN), Wide Area Networks (WAN), Internet (e.g., the Internet), and End-to-End Networks (e.g., ad hoc End-to-End Networks), as well as any currently known or future developed networks.

The computer-readable medium may be included in the above-mentioned electronic device; it may also exist sepa-rately and not be assembled into the electronic device.

The computer-readable medium carries one or more pro-grams that, when the one or more programs are executed by the electronic device, enable the electronic device:

collecting a to-be-processed image comprising a target object, and processing a to-be-processed effect part of the target object as a first effect to obtain a first effect display image; and scaling up the first effect display image for display, and in accordance with a determination that a stop scaling up condition is detected, processing a to-be-adjusted effect part of the first effect display image as a second effect to obtain a second effect display image.

Computer program code for performing the operations of the present disclosure may be written in one or more programming languages, or combinations thereof, including object-oriented programming languages such as Java, Smalltalk, C++, conventional procedural programming lan-guages such as the "C" language, or similar programming languages. or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer over any kind of network, including a LAN or WAN, or it may be connected to an external computer (e.g., via an Internet connection using an Internet service provider).

The flowcharts and block diagrams in the accompanying drawings illustrate the architecture, functionality, and opera-tion of systems, methods, and computer program products that may be implemented in accordance with various embodiments of the present disclosure. At this point, respec-tive box in the flowcharts or block diagrams may represent a module, program segment, or portion of code that contains one or more executable instructions for implementing a specified logical function. It should also be noted that in some implementations that are determined to be substitu-tions, the functions indicated in the boxes may also occur in a different order than that indicated in the accompanying drawings. For example, two consecutively represented boxes may actually be executed substantially in parallel, and they may sometimes be executed in reverse order, depending on the function involved. It should also be noted that respective of the boxes in the block diagrams and I or flowcharts, as well as combinations of the boxes in the block diagrams and I or flowcharts, may be implemented in a dedicated hardware-based system that performs the speci-fied function or operation, or may be implemented in a combination of dedicated hardware and computer instruc-tions.

Units described as being involved in embodiments of the present disclosure may be implemented by way of software or may be implemented by way of hardware. Wherein the name of a unit does not in some cases constitute a limitation of the unit itself, for example, a first obtaining unit may also be described as "a unit for obtaining at least two Internet Protocol addresses".

The functions described above herein may be performed, at least in part, by one or more hardware logic components. For example, exemplary types of hardware logic components that may be used include: Field Programmable Gate Array (FPGA), Application Specific Integrated Circuit (ASIC), Application Specific Standard Parts (ASSP), System on Chip (SOC), and System on Chip (SOC). Application Specific Standard Parts (ASSP), System on Chip (System on Chip, SOC), Complex Programmable Logic Device (Complex Programmable logic device CPLD) and so on.

In the context of the present disclosure, a machine-readable medium may be a tangible medium that may include or store a program for use by or in conjunction with an instruction execution system, device, or apparatus. The machine-readable medium may be a machine-readable signal medium or a machine-readable storage medium. The machine-readable medium may comprise an electronic, magnetic, optical, electromagnetic, infrared, or semiconductor system, device, or apparatus, or any suitable combination thereof. Machine-readable storage media may comprise an electrical connection based on one or more wires, a portable computer disk, a hard disk, a random access memory (RAM), a read-only memory (ROM), an erasable programmable read-only memory (EPROM or flash memory), a fiber optic, a compact disk-read-only memory (CD-ROM) for convenience, an optical storage device, a magnetic storage device, or any suitable combination of the foregoing. or any suitable combination thereof.

According to one or more embodiments of the present disclosure, [Example 1] provides a method of image processing, comprising:

collecting a to-be-processed image comprising a target object, and processing a to-be-processed effect part of the target object as a first effect to obtain a first effect display image; and scaling up the first effect display image for display, and in accordance with a determination that a stop scaling up condition is detected, processing a to-be-adjusted effect part of the first effect display image as a second effect to obtain a second effect display image.

According to one or more embodiments of the present disclosure, [Example 2] provides a method of image processing, further comprising:

collecting a to-be-processed image comprising a target object, comprising: in accordance with a detection that an image processing control is triggered, collecting the to-be-processed image comprising the target object; and/or, in accordance with a determination, based on collected voice information, that an image processing wake-up word is triggered, collecting the to-be-processed image comprising the target object; and/or, determining a to-be-detected feature of facial information in a collected to-be-used image, and in accordance with a determination that the detected feature matches a predetermined feature, determining the to-be-used image as the to-be-processed image.

According to one or more embodiments of the present disclosure, [Example 3] provides a method of image processing, further comprising:

processing a to-be-processed effect part of the target object as a first effect to obtain a first effect display image comprising:

determining a facial image of the target object in the to-be-processed image; and determining the to-be-processed effect part from the facial image, and processing the effect site to be processed as the first effect to obtain the first effect display image.

According to one or more embodiments of the present disclosure, [Example 4] provides a method of image processing, further comprising:

processing a to-be-processed effect part of the target object as a first effect to obtain a first effect display image comprising:

processing the to-be-processed image based on a pre-trained image processing model, to obtain the first effect display image with the to-be-processed effect part of the target object being processed as the first effect.

According to one or more embodiments of the present disclosure, [Example 5] provides a method of image processing, further comprising:

scaling up the first effect display image for display comprising:

gradually scaling up the first effect display image for display.

According to one or more embodiments of the present disclosure, [Example 6] provides a method of image processing, further comprising:

scaling up the first effect display image for display comprising:

in accordance with a determination that the number of target objects in the first effect display image is larger than one, scaling up an effect display image corresponding to the plurality of target objects in a split screen for display.

According to one or more embodiments of the present disclosure, [Example 7] provides a method of image processing, further comprising:

gradually scaling up the first effect display image for display comprising:

gradually scaling up the first effect display image by a predetermined scale for display; or, gradually scaling up a facial image of the target object in the first effect display image by a predetermined scale for display; or, gradually scaling up a facial image of the target object in the first effect display image by a predetermined scale, and in accordance with a detection that a scaling up scale of the facial image reaches a predetermined scaling up scale threshold, gradually scaling up the to-be-processed effect part that is processed as the first effect for display.

According to one or more embodiments of the present disclosure, [Example 8] provides a method of image processing, further comprising:

the stop scaling up condition comprising at least one of:

a display size of the first effect display image reaching a predetermined display size threshold; or, a duration of scaling up the first effect display image for display reaching a predetermined scaled up display duration threshold.

According to one or more embodiments of the present disclosure, [Example 9] provides a method of image processing, further comprising:

processing a to-be-adjusted effect part of the first effect display image as a second effect to obtain a second effect display image comprising:

determining the to-be-adjusted effect part of the first effect display image, and processing the to-be-adjusted effect part to be the second effect based on scene information of a scene to which the to-be-processed image belongs, to obtain the second effect display image.

According to one or more embodiments of the present disclosure, [Example 10] provides a method of image processing, further comprising:

processing a to-be-adjusted effect part as a second effect comprising:

based on scene information of a scene to which the to-be-processed image belongs, determining a to-be-overlaid effect from the at least one to-be-selected effect; wherein the to-be-overlaid effect is the second effect; and overlaying the to-be-overlaid effect on the to-be-adjusted effect part.

According to one or more embodiments of the present disclosure, [Example 11] provides a method of image processing, further comprising:

in accordance with a determination that the second effect display image satisfies a scaling down condition, scaling down the second effect display image.

According to one or more embodiments of the present disclosure, [Example 12] provides a method of image processing, further comprising:

in accordance with a determination that the second effect display image satisfies a scaling down condition, scaling down the second effect display image comprising:

in accordance with a determination that the second effect display image is detected to satisfy a scaling down condition, gradually scaling down a size of the second effect display image to an original size; wherein an image size consistent with a size of the to-be-processed image is determined as the original size, and the scaling down condition comprises at least one of a display duration of the second effect display image reaching a predetermined display duration threshold, and detecting a trigger for a scaling down control.

According to one or more embodiments of the present disclosure, [Example 13] provides a method of image processing, further comprising:

during the scaling down of the second effect display image, maintaining the effect of the second effect display image unchanged; or, during the scaling down of the second effect display image, removing a plurality of effects sequentially from the second effect display image.

According to one or more embodiments of the present disclosure, [Example 14] provides a method of image processing, further comprising:

after gradually scaling down a size of the second effect display image to an original size, further comprising:

replacing the second effect display image restored to the original size with the to-be-processed image.

According to one or more embodiments of the present disclosure, [Example 15] provides a method of image processing, further comprising:

in accordance with a determination that the second effect display image is obtained or the size of the second effect display image is scaled down to the original size, adding an additional effect for the second effect display image, and updating the second effect display image based on the additional effect;

wherein the additional effect is at least one of a dynamic effect and a static effect.

According to one or more embodiments of the present disclosure, [Example 16] provides an apparatus for image processing, comprising:

a first effect display image determination module configured to collect a to-be-processed image comprising a target object, and processing a to-be-processed effect part of the target object as a first effect to obtain a first effect display image; and a second effect display image determination module configured to scale up the first effect display image for display, and in accordance with a determination that a stop scaling up condition is detected, processing a to-be-adjusted effect part of the first effect display image as a second effect to obtain a second effect display image.

Furthermore, although a plurality of operations is depicted in a particular order, this should not be construed as requiring that the operations be performed in the particular order shown or in sequential order of performance. In certain environments, multitasking and parallel processing may be advantageous. Similarly, while a plurality of implementation details is included in the above discussion, these should not be construed as limiting the scope of the present disclosure. Some of the features described in the context of separate embodiments may also be implemented in combination in a single embodiment. Conversely, a plurality of features described in the context of a single embodiment may also be implemented in a plurality of embodiments, either individually or in any suitable sub-combination.

We claim:

1. A method of image processing, comprising:

collecting a first image comprising a target object, comprising at least one of:

in accordance with a determination, based on collected voice information, that an image processing wake-up word is triggered, collecting the first image comprising the target object; or determining a feature of facial information in a second image, and in accordance with a determination that the feature matches a predetermined feature, determining the second image as the first image;

processing a first effect part of the target object as a first effect to obtain a first effect display image; and scaling up the first effect display image for display, and in accordance with a determination that a stop scaling up condition is detected, processing a second effect part of the first effect display image as a second effect to obtain a second effect display image.

2. The method of claim 1, wherein processing the first effect part of the target object as a first effect to obtain a first effect display image comprises:

determining a facial image of the target object in the first image; and determining the first effect part from the facial image, and processing the effect site to be processed as the first effect to obtain the first effect display image.

3. The method of claim 1, wherein processing the first effect part of the target object as a first effect to obtain a first effect display image comprises:

processing the first image based on a pre-trained image processing model, to obtain the first effect display image with the first effect part of the target object being processed as the first effect.

4. The method of claim 1, wherein scaling up the first effect display image for display comprises:

gradually scaling up the first effect display image for display.

5. The method of claim 1, wherein scaling up the first effect display image for display comprises:

in accordance with a determination that the number of target objects in the first effect display image is larger than one, scaling up an effect display image corresponding to the plurality of target objects in a split screen for display.

6. The method of claim 4, wherein gradually scaling up the first effect display image for display comprises:

gradually scaling up the first effect display image by a predetermined scale for display;

gradually scaling up a facial image of the target object in the first effect display image by a predetermined scale for display; or, gradually scaling up a facial image of the target object in the first effect display image by a predetermined scale, and in accordance with a detection that a scaling up scale of the facial image reaches a predetermined scaling up scale threshold, gradually scaling up the first effect part that is processed as the first effect for display.

7. The method of claim 1, wherein the stop scaling up condition comprises at least one of:

a display size of the first effect display image reaching a predetermined display size threshold; or, a duration of scaling up the first effect display image for display reaching a predetermined scaled up display duration threshold.

8. The method of claim 1, wherein processing the second effect part of the first effect display image as a second effect to obtain a second effect display image comprises:

determining the second effect part of the first effect display image, and processing the second effect part to be the second effect based on scene information of a scene to which the first image belongs, to obtain the second effect display image;

wherein the first effect is different from the second effect.

9. The method of claim 1, further comprising:

in accordance with a determination that the second effect display image satisfies a scaling down condition, scaling down the second effect display image.

10. The method of claim 9, wherein in accordance with the determination that the second effect display image satisfies the scaling down condition, scaling down the second effect display image comprises:

in accordance with a determination that the second effect display image is detected to satisfy a scaling down condition, gradually scaling down a size of the second effect display image to an original size; wherein an image size consistent with a size of the first image is determined as the original size, and the scaling down condition comprises at least one of a display duration of the second effect display image reaching a predetermined display duration threshold, and detecting a trigger for a scaling down control.

11. The method of claim 10, wherein gradually scaling down the size of the second effect display image to the original size comprises:

during the scaling down of the second effect display image, maintaining the effect of the second effect display image unchanged, and in accordance with a detection that the size of the second effect display image is restored to the original size, replacing the second effect display image restored to the original size with the first image; or, during the scaling down of the second effect display image, removing a plurality of effects from the second effect display image, to cause the scaled-down image to be the first image when the size of the second effect display image is scaled down to the original size.

12. The method of claim 9, further comprising:

in accordance with a determination that the second effect display image is obtained or the size of the second effect display image is scaled down to the original size, adding an additional effect for the second effect display image, and updating the second effect display image based on the additional effect;

wherein the additional effect is at least one of a dynamic effect and a static effect.

13. An electronic device, comprising:

at least one processor; and a storage apparatus configured to store at least one program;

wherein the at least one program, when executed by the at least one processor, causes the at least one processor to perform a method of image processing comprising:

collecting a first image comprising a target object, comprising at least one of:

in accordance with a determination, based on collected voice information, that an image processing wake-up word is triggered, collecting the first image comprising the target object; or determining a feature of facial information in a second image, and in accordance with a determination that the feature matches a predetermined feature, determining the second image as the first image;

processing a first effect part of the target object as a first effect to obtain a first effect display image; and scaling up the first effect display image for display, and in accordance with a determination that a stop scaling up condition is detected, processing a second effect part of the first effect display image as a second effect to obtain a second effect display image.

14. The electronic device of claim 13, wherein processing the first effect part of the target object as a first effect to obtain a first effect display image comprises:

determining a facial image of the target object in the first image; and determining the first effect part from the facial image, and processing the effect site to be processed as the first effect to obtain the first effect display image.

15. The electronic device of claim 13, wherein processing the first effect part of the target object as a first effect to obtain a first effect display image comprises:

processing the first image based on a pre-trained image processing model, to obtain the first effect display image with the first effect part of the target object being processed as the first effect.

16. The electronic device of claim 13, wherein scaling up the first effect display image for display comprises:

gradually scaling up the first effect display image for display.

17. The electronic device of claim 13, wherein scaling up the first effect display image for display comprises:

in accordance with a determination that the number of target objects in the first effect display image is larger than one, scaling up an effect display image corresponding to the plurality of target objects in a split screen for display.

18. A non-transitory storage medium comprising computer-executable instructions, the computer-executable instructions, when executed by a computer processor, performing a method of image processing comprising:

collecting a first image comprising a target object, comprising at least one of:

in accordance with a determination, based on collected voice information, that an image processing wake-up word is triggered, collecting the first image comprising the target object; or determining a feature of facial information in a second image, and in accordance with a determination that the feature matches a predetermined feature, determining the second image as the first image;

processing a first effect part of the target object as a first effect to obtain a first effect display image; and scaling up the first effect display image for display, and in accordance with a determination that a stop scaling up condition is detected, processing a second effect part of the first effect display image as a second effect to obtain a second effect display image.

* * * * *